(12) United States Patent
Kang et al.

(10) Patent No.: US 9,794,032 B2
(45) Date of Patent: Oct. 17, 2017

(54) PPDU RECEIVING METHOD AND APPARATUS BASED ON THE MIMO TECHNIQUE IN A WLAN SYSTEM

(75) Inventors: Byeong Woo Kang, Anyang-si (KR); Yu Jin Noh, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 13/582,036

(22) PCT Filed: Mar. 2, 2011

(86) PCT No.: PCT/KR2011/001412
§ 371 (c)(1),
(2), (4) Date: Aug. 30, 2012

(87) PCT Pub. No.: WO2011/108832
PCT Pub. Date: Sep. 9, 2011

(65) Prior Publication Data
US 2012/0327915 A1 Dec. 27, 2012

Related U.S. Application Data

(60) Provisional application No. 61/310,713, filed on Mar. 5, 2010.

(51) Int. Cl.
*H04W 74/00* (2009.01)
*H04L 5/00* (2006.01)
(Continued)

(52) U.S. Cl.
CPC .............. *H04L 5/003* (2013.01); *H04L 5/001* (2013.01); *H04L 5/0007* (2013.01);
(Continued)

(58) Field of Classification Search
None
See application file for complete search history.

(56) References Cited

U.S. PATENT DOCUMENTS

2004/0242252 A1* 12/2004 Hoeben ................. H04W 28/26
455/503
2005/0286446 A1* 12/2005 Barber .......................... 370/278
(Continued)

FOREIGN PATENT DOCUMENTS

KR     10-2010-0011141     2/2010

*Primary Examiner* — Hassan Phillips
*Assistant Examiner* — Ayanah George
(74) *Attorney, Agent, or Firm* — Lee Hong Degerman Kang Waimey

(57) ABSTRACT

Provided is a method of receiving a physical layer convergence procedure (PLCP) protocol data unit (PPDU) by an access point (AP) in a wireless local area (LAN) system. The method includes: allocating a first transmission channel bandwidth to a first station (STA) which is multiple input multiple output (MIMO)-paired with the AP; allocating a second transmission channel bandwidth to a second STA which is MIMO-paired with the AP; transmitting to the first STA and the second STA a sync trigger for determining a time point at which the first STA transmits a first PPDU and a time point at which the second STA transmits a second PPDU; and receiving simultaneously the first PPDU and the second PPDU from the first STA and the second STA.

13 Claims, 16 Drawing Sheets

(51) Int. Cl.
  *H04L 1/18* (2006.01)
  *H04W 72/04* (2009.01)
  *H04B 7/0452* (2017.01)

(52) U.S. Cl.
  CPC .......... *H04L 5/0053* (2013.01); *H04B 7/0452* (2013.01); *H04L 1/1861* (2013.01); *H04W 72/0406* (2013.01)

(56) References Cited

U.S. PATENT DOCUMENTS

| | | | | |
|---|---|---|---|---|
| 2007/0025290 | A1* | 2/2007 | Afrashteh | H04W 72/087 370/330 |
| 2008/0137627 | A1* | 6/2008 | Fischer | H04W 16/14 370/338 |
| 2008/0192622 | A1* | 8/2008 | Scheim | H04L 1/0025 370/210 |
| 2009/0196240 | A1* | 8/2009 | Frederiksen | H04L 1/1607 370/329 |
| 2009/0290616 | A1* | 11/2009 | Sridhara et al. | 375/146 |
| 2010/0144359 | A1* | 6/2010 | Song | H04W 28/16 455/450 |
| 2010/0177757 | A1* | 7/2010 | Kim et al. | 370/338 |
| 2010/0260060 | A1* | 10/2010 | Abraham et al. | 370/252 |
| 2010/0284393 | A1* | 11/2010 | Abraham et al. | 370/343 |
| 2010/0309871 | A1* | 12/2010 | Fischer | H04L 5/0023 370/329 |
| 2010/0329195 | A1* | 12/2010 | Abraham | H04W 52/42 370/329 |
| 2011/0110454 | A1* | 5/2011 | Sampath et al. | 375/295 |

* cited by examiner

PPDU RECEIVING METHOD AND APPARATUS BASED ON THE MIMO TECHNIQUE IN A WLAN SYSTEM

CROSS-REFERENCE TO RELATED APPLICATIONS

This application is the National Stage filing under 35 U.S.C. 371 of International Application No. PCT/KR2011/001412, filed on Mar. 2, 2011, which claims the benefit of U.S. Provisional Application Ser. No. 61/310,713, filed on Mar. 5, 2010, the contents of which are all hereby incorporated by reference herein in their entirety.

TECHNICAL FIELD

The present invention relates to wireless communications, and more particularly, to a method of receiving a physical layer convergence procedure (PLCP) protocol data unit (PPDU) in a wireless local area network (WLAN) system and an apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted.

In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

An IEEE 802.11n HT WLAN system employs an HT green field physical layer convergence procedure (PLCP) protocol data unit (PPDU) format which is a PPDU format designed effectively for an HT station (STA) and which can be used in a system consisting of only HT STAs supporting IEEE 802.11n in addition to a PPDU format supporting a legacy STA. In addition, an HT-mixed PPDU format which is a PPDU format defined such that a system in which the legacy STA and the HT STA coexist can support an HT system.

With the widespread use of the WLAN and the diversification of applications using the WLAN, there is a recent demand for a new WLAN system to support a higher throughput in comparison with a data processing rate supported by the IEEE 802.11n. A very high throughput (VHT) WLAN system is a next version of the IEEE 802.11n WLAN system, and is one of IEEE 802.11 WLAN systems which have recently been proposed to support a data processing rate of above 1 Gbps in a medium access control (MAC) service access point (SAP).

The VHT WLAN system allows a plurality of VHT STAB to simultaneously access a channel in order to effective use a radio channel. For this, multi-user multiple input multiple output (MU-MIMO)-based transmission using multiple antennas is supported. A VHT access point (AP) can perform spatial division multiple access (SDMA) transmission for transmitting spatial-multiplexed data to the plurality of VHT STAs. When data is simultaneously transmitted by distributing a plurality of spatial streams to the plurality of STAs by the use of a plurality of antennas, an overall throughput of the WLAN system can be increased.

In a multi-user environment in which one AP supports a plurality of STAs, there is on-going research on multiple transmission and reception antenna transmission techniques or the like by considering multiple users in order to increase overall channel capacity of a MU-MIMO system considering multiple users. The multi-user channel environment needs to guarantee that a channel matrix is in a good state so that all MU-MIMO schemes can fully use spatial flexibility. Thus, it is required that the multiple users can simultaneously perform transmission with respective desired data transfer rates without being restricted by interference. Since the AP transmits a radio signal simultaneously to several STAs in a downlink channel, each STA receives a signal of another user in addition to a desired signal, which may act as interference. To suppress the interference, the AP can perform channel filtering to cancel the interference. For example, a zero-forcing filter can be used to decrease the interference.

The VHT WLAN system can support a wider bandwidth than an HT WLAN system. However, similarly to the HT WLAN system, not all STAs can support the greatest bandwidth supported by the system. When two STAs support different bandwidths, if simultaneous channel access is disabled, the STAs access and use the channel in a time division manner, which results in deterioration of efficiency in the use of radio resources. Therefore, if the AP can receive data simultaneously from a plurality of STAs which use different bandwidths as a transmission channel bandwidth, an overall throughput of a WLAN system consisting of the AP and the plurality of STAs can be more improved. For this, there is a need for a method which allows the AP to be able to simultaneously receive data from the plurality of STAs.

SUMMARY OF INVENTION

Technical Problem

The present invention provides a method for enabling simultaneous reception of a physical layer convergence procedure (PLCP) protocol data unit (PPDU) from a plurality of stations (STAs) on the basis of multiple input multiple output (MIMO) in a wireless local area network (WLAN) system and an apparatus supporting the method.

Technical Solution

In an aspect, a method of receiving a physical layer convergence procedure (PLCP) protocol data unit (PPDU) by an access point (AP) in a wireless local area (LAN) system is provided. The method includes: allocating a first transmission channel bandwidth to a first station (STA) which is multiple input multiple output (MIMO)-paired with the AP; allocating a second transmission channel bandwidth to a second STA which is MIMO-paired with the AP; transmitting to the first STA and the second STA a sync trigger for determining a time point at which the first STA transmits a first PPDU and a time point at which the second STA transmits a second PPDU; and receiving simultaneously the first PPDU and the second PPDU from the first STA and the second STA.

The sync trigger may be a clear to send (CTS) frame transmitted in response to a request to send (RTS) frame transmitted for frame transmission by the first STA and the second STA.

The sync trigger may be a CTS-to-self frame, a recipient address of the CTS-to-self frame indicating an address of the AP.

The sync trigger may be a frame including sync triggering information, and the sync triggering information may indicate a time point at which the first STA transmits the first PPDU and a time point at which the second STA transmits the second PPDU.

The method may further include transmitting transmission channel indication information to the first STA. The first transmission channel bandwidth may be determined to the same bandwidth or a smaller bandwidth between a recommended transmission channel bandwidth indicated by the transmission channel indication information and a supported transmission channel bandwidth supported by the first STA.

The transmission channel indication information may be transmitted together with dedicated control information required individually by the first STA for the MIMO reception.

The transmission channel indication information
may be configured in a bitmap format in which a value of the recommended transmission channel bandwidth corresponds to a specific bit value.

The transmission channel indication information may indicate whether a channel bandwidth divided by a specific bandwidth size can be used as a transmission channel in a bit format.

The first transmission channel bandwidth and the second transmission channel bandwidth may be less than or equal to a full bandwidth supported by the AP.

In another aspect, a wireless apparatus is provided. The wireless apparatus includes: a processor; and a transceiver operatively coupled to the processor and transmitting and receiving a frame. The processor is configured for: allocating a first transmission channel bandwidth to a first STA which is MIMO-paired with the AP; allocating a second transmission channel bandwidth to a second STA which is MIMO-paired with the AP; transmitting to the first STA and the second STA a sync trigger for determining a time point at which the first STA transmits a first PPDU and a time point at which the second STA transmits a second PPDU; and receiving simultaneously the first PPDU and the second PPDU from the first STA and the second STA.

Advantageous Effects

Synchronization triggering is performed so that a physical layer convergence procedure (PLCP) protocol data unit (PPDU) can be received simultaneously from a plurality of stations (STAs) which are multiple input multiple output (MIMO)-paired with an access point (AP), thereby improving an overall throughput of a wireless local area network (WLAN) system.

In addition, since STAs to which different bandwidths are allocated or which support different bandwidths can simultaneously transmit a PPDU, a bottleneck phenomenon can be decreased and a throughput of the WLAN system can be improved.

MODE FOR INVENTION

Hereinafter, embodiments of the present invention will be described in detail with reference to the accompanying drawings.

A wireless local area network (WLAN) system according to an embodiment of the present invention includes at least one basic service set (BSS). The BSS is a set of stations (STAs) successfully synchronized to communicate with one another. The BSS can be classified into an independent BSS (IBSS) and an infrastructure BSS.

The BSS includes at least one STA and an access point (AP). The AP is a functional medium for providing a connection to STAs in the BSS through respective wireless media. The AP can also be referred to as other terminologies such as a centralized controller, a base station (BS), a scheduler, etc.

The STA is any functional medium including a medium access control (MAC) and wireless-medium physical layer (PHY) interface satisfying the institute of electrical and electronics engineers (IEEE) 802.11 standard. The STA may be an AP or a non-AP STA. Hereinafter, the STA refers to the non-AP STA unless specified otherwise.

The STA can be classified into a very high throughput (VHT)-STA, a high throughput (HT)-STA, and a legacy (L)-STA. The HT-STA is an STA supporting IEEE 802.11n. The L-STA is an STA supporting a previous version of IEEE 802.11n, for example, IEEE 802.11a/b/g. The L-STA is also referred to as a non-HT STA.

Figure 1:
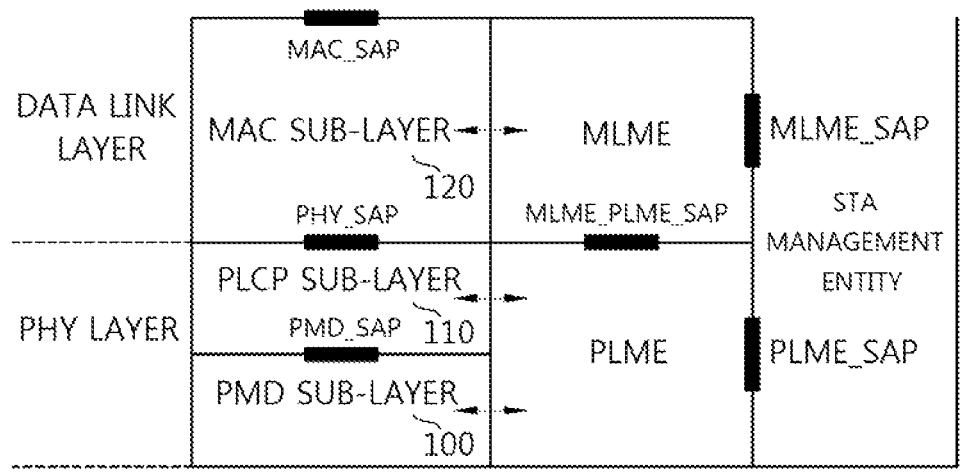
FIG. 1 shows an IEEE 802.11 physical layer (PHY) architecture.

FIG. 1 shows an IEEE 802.11 physical layer (PHY) architecture.

The IEEE 802.11 PHY architecture includes a PHY layer management entity (PLME), a physical layer convergence procedure (PLCP) sub-layer 110, and a physical medium dependent (PMD) sub-layer 100. The PLME provides a PHY management function in cooperation with a MAC layer management entity (MLME). The PLCP sub-layer 110 located between a MAC sub-layer 120 and the PMD sub-layer 100 delivers to the PMD sub-layer 100 a MAC protocol data unit (MPDU) received from the MAC sub-layer 120 under the instruction of the MAC layer, or delivers to the MAC sub-layer 120 a frame received from the PMD sub-layer 100. The PMD sub-layer 100 is a lower layer of the PDCP sub-layer and serves to enable transmission and reception of a PHY entity between two STAs through a radio medium. The MPDU delivered by the MAC sub-layer 120 is referred to as a physical service data unit (PSDU) in the PLCP sub-layer 110. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 110 attaches an additional field including information required by a PHY transceiver to the MPDU in a process of receiving the MPDU from the MAC sub-layer 120 and delivering a PSDU to the PMD sub-layer 100. The additional field attached in this case may be a PLCP preamble, a PLCP header, tail bits required on a data field, etc. The PLCP preamble serves to allow a receiver to prepare a synchronization function and antenna diversity before the PSDU is transmitted. The PLCP header includes a field that contains information on a PLCP protocol data unit (PDU) to be transmitted, which will be described below in greater detail with reference to FIG. 2.

The PLCP sub-layer 110 generates a PLCP protocol data unit (PPDU) by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data.

Figure 2:
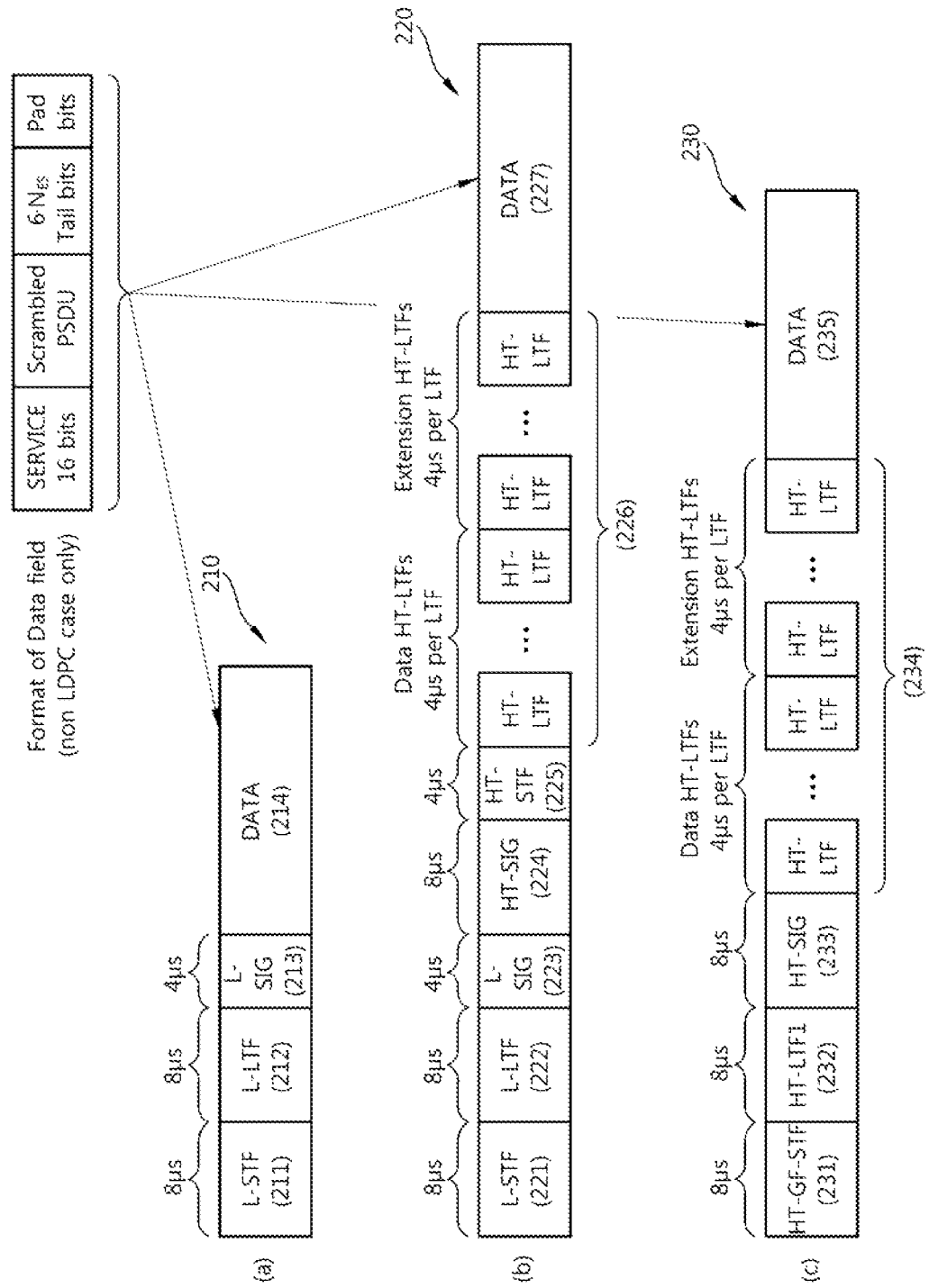
FIG. 2 is a diagram showing an example of a PPDU format used in a WLAN system based on the IEEE 802.11n standard.

FIG. 2 is a diagram showing an example of a PPDU format used in a WLAN system based on the IEEE 802.11n standard.

Referring to FIG. 2, there are three types of PPDUs supported in IEEE 802.11n.

FIG. 2 (a) shows a legacy PPDU (L-PPDU) format for a PPDU used in the existing IEEE 802.11a/b/g. Therefore, an L-STA can transmit and receive an L-PPDU having this format in a WLAN system based on the IEEE 802.11n standard.

Referring to FIG. 2(a), an L-PPDU 210 includes an L-STF field 211, an L-LTF field 212, an L-SIG field 213, and a data field 214.

The L-STF field 211 is used for frame timing acquisition, automatic gain control (AGC) convergence, coarse frequency acquisition, etc.

The L-LTF field 212 is used for frequency offset and channel estimation.

The L-SIG field 213 includes control information for demodulation and decoding of the data field 214.

FIG. 2(b) is a diagram showing an HT-mixed PPDU format in which an L-STA and an HT-STA can coexist. Referring to FIG. 2(b), an HT-mixed PPDU 220 includes an L-STF field 221, an L-LTF field 222, an L-SIG field 223, an HT-SIG field 224, an HT-STF field 225, a plurality of HT-LTF fields 226, and a data field 227.

The L-STF field 221, the L-LTF field 222, and the L-SIG field 223 are identical to those indicated by the reference numerals 211, 212, and 213 of FIG. 2(a). Therefore, the L-STA can interpret the data field by using the L-STF field 221, the L-LTF field 222, and the L-SIG field 223 even if the HT-mixed PPDU 220 is received. The L-LTF field 222 may further include information for channel estimation to be performed by the HT-STA in order to receive the HT-mixed PPDU 220 and to interpret the L-SIG field 223, the HT-SIG field 224, and the HT-STF field 225.

The HT-STA can know that the HT-mixed PPDU 220 is a PPDU dedicated to the HT-STA by using the HT-SIG field 224 located next to the L-SIG field 223, and thus can demodulate and decode the data field 227.

The HT-STF field 225 may be used for frame timing synchronization, AGC convergence, etc., for the HT-STA.

The HT-LTF field 226 may be used for channel estimation for demodulation of the data field 227. Since the IEEE 802.11n supports single user-MIMO (SU-MIMO), a plurality of the HT-LTF fields 226 may be configured for channel estimation for each of data fields transmitted through a plurality of spatial streams.

The HT-LTF field 226 may consist of a data HT-LTF used for channel estimation for a spatial stream and an extension HT-LTF additionally used for full channel sounding. Therefore, the number of the plurality of HT-LTF fields 226 may be equal to or greater than the number of spatial streams to be transmitted.

The L-STF field 221, the L-LTF field 222, and the L-SIG field 223 are transmitted first so that the L-STA also can acquire data by receiving the HT-mixed PPDU 220. Thereafter, the HT-SIG field 224 is transmitted for demodulation and decoding of data transmitted for the HT-STA.

Up to fields located before the HT-SIG field 224, transmission is performed without beamforming so that the L-STA and the HT-STA can acquire data by receiving a corresponding PPDU. In the subsequently fields, i.e., the HT-STF field 225, the HT-LTF field 226, and the data field 227, radio signal transmission is performed by using precoding. In this case, the HT-STF field 225 is transmitted so that an STA that receives a precoded signal can consider a varying part caused by the precoding, and thereafter the plurality of HT-LTF fields 226 and the data field 227 are transmitted.

Even if an HT-STA that uses 20 MHz in an HT WLAN system uses 52 data subcarriers per OFDM symbol, an L-STA that also uses 20 MHz uses 48 data subcarriers per OFDM symbol. Since the HT-SIG field 224 is decoded by using the L-LTF field 222 in a format of the HT-mixed PPDU 220 to support backward compatibility, the HT-SIG field 224 consists of 48×2 data subcarriers. The HT-STF field 225 and the HT-LTF 226 consist of 52 data subcarriers per OFDM symbol. As a result, the HT-SIG field 224 is supported using ½ binary phase shift keying (BPSK), each HT-SIG field 224 consists of 24 bits, and thus 48 bits are transmitted in total. That is, channel estimation for the L-SIG field 223 and the HT-SIG field 224 is performed using the L-LTF field 222, and a bit sequence constituting the L-LTF field 222 can be expressed by Equation 1 below. The L-LTF field 222 consists of 48 data subcarriers per one symbol, except for a DC subcarrier.

$$L_{26,26} = \{1,1,-1,-1,1,1,-1,1,-1,1,1,1,1,1,1,-1,-1,1,1,-1, 1,-1,1,1,1,1,0,1,-1,-1,1,1,-1,1,-1,1,-1,1,-1,-1, 1,-1,-1,1, 1,-1,-1,1,-1,1,-1,-1,1,1,1,1\}$$ [Equation 1]

FIG. 2(c) is a diagram showing a format of an HT-Greenfield (GF) PPDU 230 that can be used by only an HT-STA. Referring to FIG. 2(c), the HT-GF PPDU 230 includes an HT-GF-STF field 231, an HT-LTF1 field 232, an HT-SIG field 233, a plurality of HT-LTF2 fields 234, and a data field 235.

The HT-GF-STF field 231 is used for frame timing acquisition and AGC.

The HT-LTF1 field 232 is used for channel estimation.

The HT-SIG field 233 is used for demodulation and decoding of the data field 235.

The HT-LTF2 234 is used for channel estimation for demodulation of the data field 235. Since the HT-STA uses SU-MIMO, channel estimation is required for each of data fields transmitted through a plurality of spatial streams, and thus a plurality of HT-LTF2 fields 234 may be configured.

The plurality of HT-LTF2 fields 234 may consist of a plurality of data HT-LTFs and a plurality of extension HT-LTFs, similarly to the HT-LTF 226 of the HT-mixed PPDU 220.

Each of the data fields 214, 227, and 235 respectively shown in FIGS. 2(a), (b), and (c) may include a service field, a scrambled PSDU field, a tail bits field, and a padding bits field.

In order to use MIMO in a WLAN system supporting an HT, an HT-LTF is defined for channel estimation. The HT-LTF is used for channel estimation similarly to an L-LTF, but has a difference in that the HT-LTF can estimate a MIMO channel. In order to estimate the MIMO channel by using the HT-LTF, the HT-LTF is used by multiplying an orthogonal mapping matrix $P_{HTLTF}$. The $P_{HTLTF}$ consists of '1' and '−1', and can be expressed by Equation 2 below.

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$ [Equation 2]

Herein, the orthogonal mapping matrix is used in a different size according to a channel layer, which will be described with reference to FIG. 3.

Figure 3:
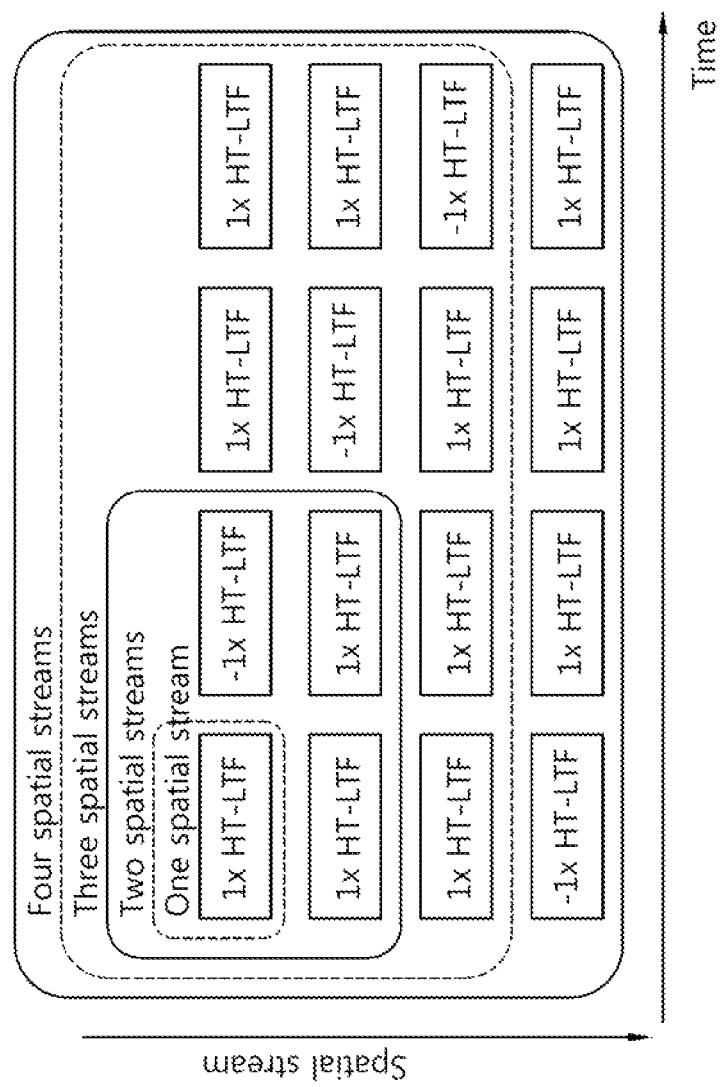
FIG. 3 shows an orthogonal mapping matrix applied according to a channel layer.

FIG. 3 shows an orthogonal mapping matrix applied according to a channel layer.

Referring to FIG. 3, a training symbol is defined on a spatial stream basis, and is transmitted for channel estimation of each spatial stream. When the number of spatial streams is 1, 2, and 4, the number of HT-LTFs to be transmitted is 1, 2, and 4, respectively. When the number of spatial streams is 3, one extra long training symbol is used so that 4 HT-LTFs can be used.

Unlike the IEEE 802.11n standard supporting the HT, a next generation WLAN system requires a higher throughput. This is called a very high throughput (VHT) to distinguish it from the HT, and 80 MHz bandwidth transmission and/or higher bandwidth transmission (e.g., 160 MHz) are supported in the next generation WLAN system. In addition, multi user-multiple input multiple output (MU-MIMO) transmission is supported.

An amount of control information transmitted to STAs for MU-MIMO transmission may be relatively greater than an amount of IEEE 802.11n control information. Examples of control information additionally required for the VHT WLAN system may be information indicating the number of spatial streams to be received by each STA, information regarding modulation and coding of data transmitted to each STA, etc. Therefore, when MU-MIMO transmission is performed in order to provide data services simultaneously to a plurality of STAs, the amount of control information to be transmitted may be increased according to the number of receiving STAs.

In order to effectively transmit the increased amount of control information to be transmitted, among a plurality of pieces of control information required for MU-MIMO transmission, common control information commonly required to all STAs and dedicated control information individually required to the STAs may be transmitted by distinguishing the two types of information.

A PPDU format used in the WLAN system supporting MU-MIMO will be described with reference to FIG. 4.

Figure 4:
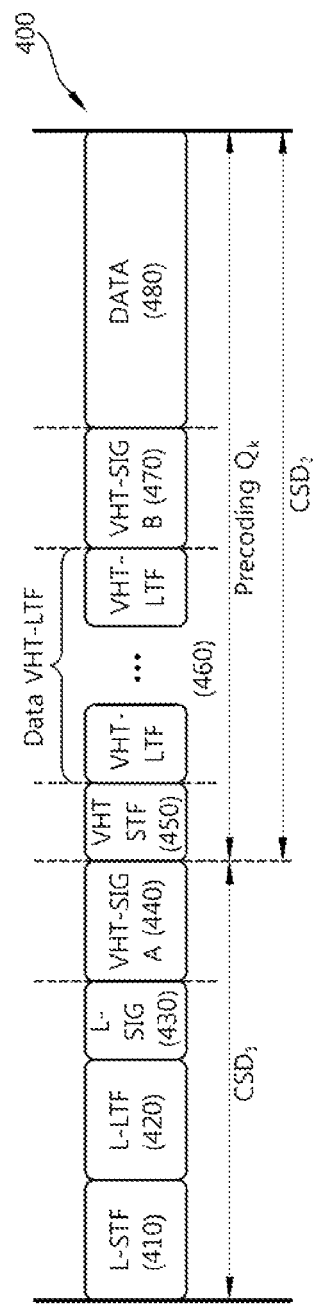
FIG. 4 shows a PPDU format used in the WLAN system supporting MU-MIMO.

Referring to FIG. 4, a PPDU 400 includes an L-STF field 410, an L-LTF field 420, an L-SIG field 430, a VHT-SIGA field 440, a VHT-STF field 450, a VHT-LTF field 460, a VHT-SIGB field 470, and a data field 480.

A PLCP sub-layer converts a PSDU delivered from a MAC layer into the data field 480 by appending necessary information to the PSDU, generates the PPDU 400 by appending several fields such as the L-STF field 410, the L-LTF field 420, the L-SIG field 430, the VHT-SIGA field 440, the VHT-STF field 450, the VHT-LTF field 460, the VHT-SIGB field 470, or the like, and delivers the PPDU 400 to one or more STAs through a PMD layer.

The L-STF field 410 is used for frame timing acquisition, automatic gain control (AGC) convergence, coarse frequency acquisition, etc.

The L-LTF field 420 is used for channel estimation for demodulation of the L-SIG field 430 and the VHT-SIGA field 440.

The L-SIG field 430 is used when an L-STA receives the PPDU to acquire data.

The VHT-SIGA field 440 includes control information for interpreting the received PPDU 400 as common control information required for VHT-STAs which are MIMO-paired with an AP. The VHT-SIGA field 440 includes information on a spatial stream for each of the plurality of MIMO-paired STAs, bandwidth information, identification information related to whether space time block coding (STBC) is used, a group identifier for an STA group, information on an STA to which each group identifier is allocated, and information related to a short guard interval (GI). Herein, the group identifier for the STA group may include whether a currently used MIMO transmission method is MU-MIMO or SU-MIMO.

The VHT-STF field 450 is used to improve performance of AGC estimation in MIMO transmission.

The VHT-LTF field 460 is used when the STA estimates a MIMO channel. Since the VHT WLAN system supports MU-MIMO, the VHT-LTF field 460 can be configured by the number of spatial streams in which the PPDU 400 is transmitted. In addition, when full channel sounding is supported and performed, the number of VHT-LTFs may increase.

The VHT-SIGB field 470 includes dedicated control information required when the plurality of MIMO-paired STAs receive the PPDU 400 to acquire data. Therefore, the STA may be designed such that the VHT-SIGB field 470 is decoded only when the common control information included in the VHT-SIGB field 470 indicates that the currently received PPDU 400 is transmitted using MU-MIMO transmission. On the contrary, the STA may be designed such that the VHT-SIGB field 470 is not decoded when the common control information indicates that the currently received PPDU 400 is for a single STA (including SU-MIMO).

The VHT-SIGB field 470 includes information on each STA's modulation, encoding, and rate-matching. A size of the VHT-SIGB field 470 may differ according to the MIMO transmission method (MU-MIMO or SU-MIMO) and a channel bandwidth used for PPDU transmission.

A VHT WLAN system supporting MIMO can support an 80 MHz (or higher) bandwidth higher than a 40 MHz bandwidth which is a maximum bandwidth supported by an HT WLAN system supporting SU-MIMO. However, similarly to the HT WLAN system in which an HT-STA and an L-STA coexist, a VHT-STA, an HT-STA, and an L-STA can coexist in the VHT WLAN system. Therefore, each STA may support a different maximum bandwidth. In addition, among VHT-STAs, channel bandwidths allocated for frame transmission and/or reception may be different from each other. Therefore, a method of allocating a channel to each STA in a full frequency band may be an important issue in the WLAN system supporting MU-MIMO. It will be described below with reference to FIG. 5.

Figure 5:
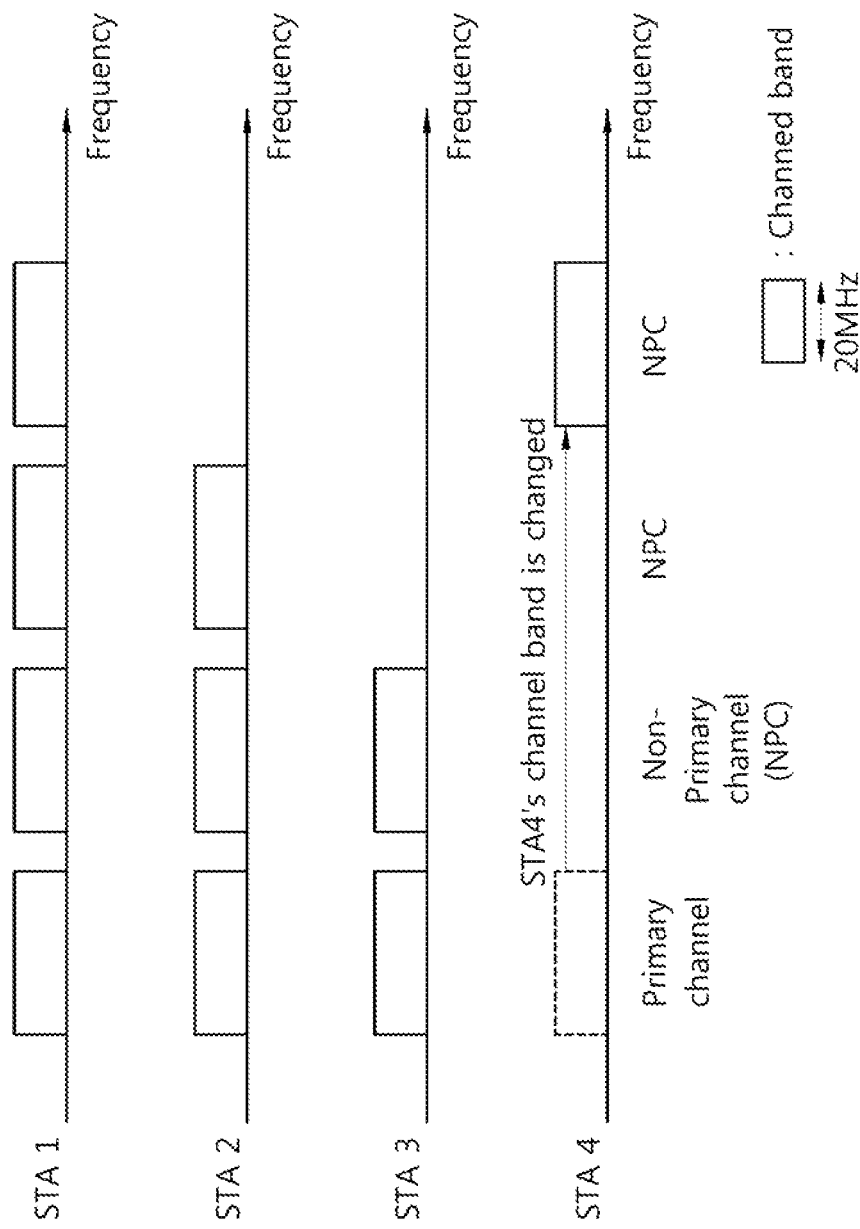
FIG. 5 shows an example of using a frequency in a frequency band to which an embodiment of the present invention is applicable.

FIG. 5 shows an example of using a frequency in a frequency band to which an embodiment of the present invention is applicable.

Referring to FIG. 5, one block on a frequency domain indicates a channel, and a bandwidth of one channel corresponds to 20 MHz. Four channels are provided as a radio resource that can be allocated to an AP and an STA which constitute a WLAN system. Among the four channels, a first channel is a primary channel, and the remaining three channels are non-primary channels (NPCs). The AP and the STA use a channel set including the primary channel when using channels for PPDU transmission and/or reception.

As a transmission channel, an STA1 uses four channels and an 80 MHz bandwidth, an STA2 uses three channels and a 60 MHz bandwidth, an STA3 uses two channels and a 40 MHz bandwidth, and an STA4 uses one channel and a 20 MHz bandwidth. Therefore, although the STA1 and the STA2 use different number of channels and different bandwidths, the STA1 and the STA2 can transmit and/or receive a PPDU by using a channel set including a primary channel.

If the STA2 and the STA4 or the STA3 and the STA4 cannot simultaneously access a channel, the two STAs have to access the channel in a time division manner, which may result in the occurrence of a bottleneck due to the STA4 supporting a small bandwidth. Therefore, if the STA2 and the STA4 or the STA3 and the STA4 can perform transmission and/or reception by simultaneously accessing the channel, in other words, if remaining channels other than a channel occupied by the STA2 is occupied by the STA4 or if a channel occupied by the STA3 is occupied by the STA4, overall network capacity of the WLAN system can be maximized.

Figure 6:
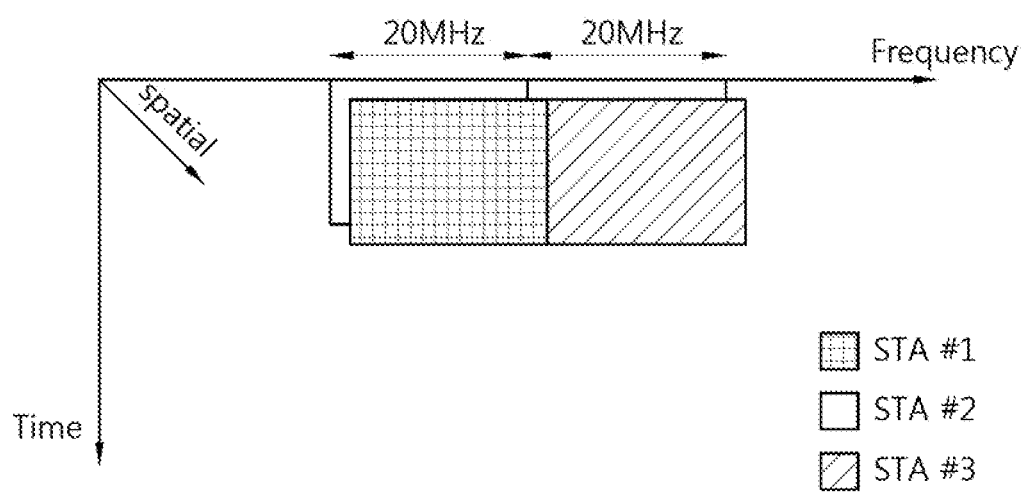
FIG. 6 shows an example of using a channel band according to an embodiment of the present invention.

FIG. 6 shows an example of using a channel band according to an embodiment of the present invention.

Referring to FIG. 6, a full frequency bandwidth is 40 MHz, and 20 MHz is allocated to each channel bandwidth. A 20 MHz channel bandwidth is allocated to an STA1 and an STA3. A 40 MHz channel bandwidth is allocated to an STA2. Since the STA1 uses a 20 MHz bandwidth when transmitting and/or receiving a frame, the remaining 20 MHz bandwidth is not used. Therefore, when the STA3 transmits a data frame, a bandwidth remaining after being used by the STA1 can be used. For this, a different precoding matrix must be applied for each channel band.

When using such a channel band, MU-MIMO transmission is possible between STAs supporting different bandwidths. In addition, since it is possible to avoid a phenomenon in which a layer is intensively increased only in one channel band, a probability of interference occurrence or an amount of interference can be decreased. Accordingly, an overall throughput of a MIMO-MIMO transmission/reception system can be improved.

Figure 7:
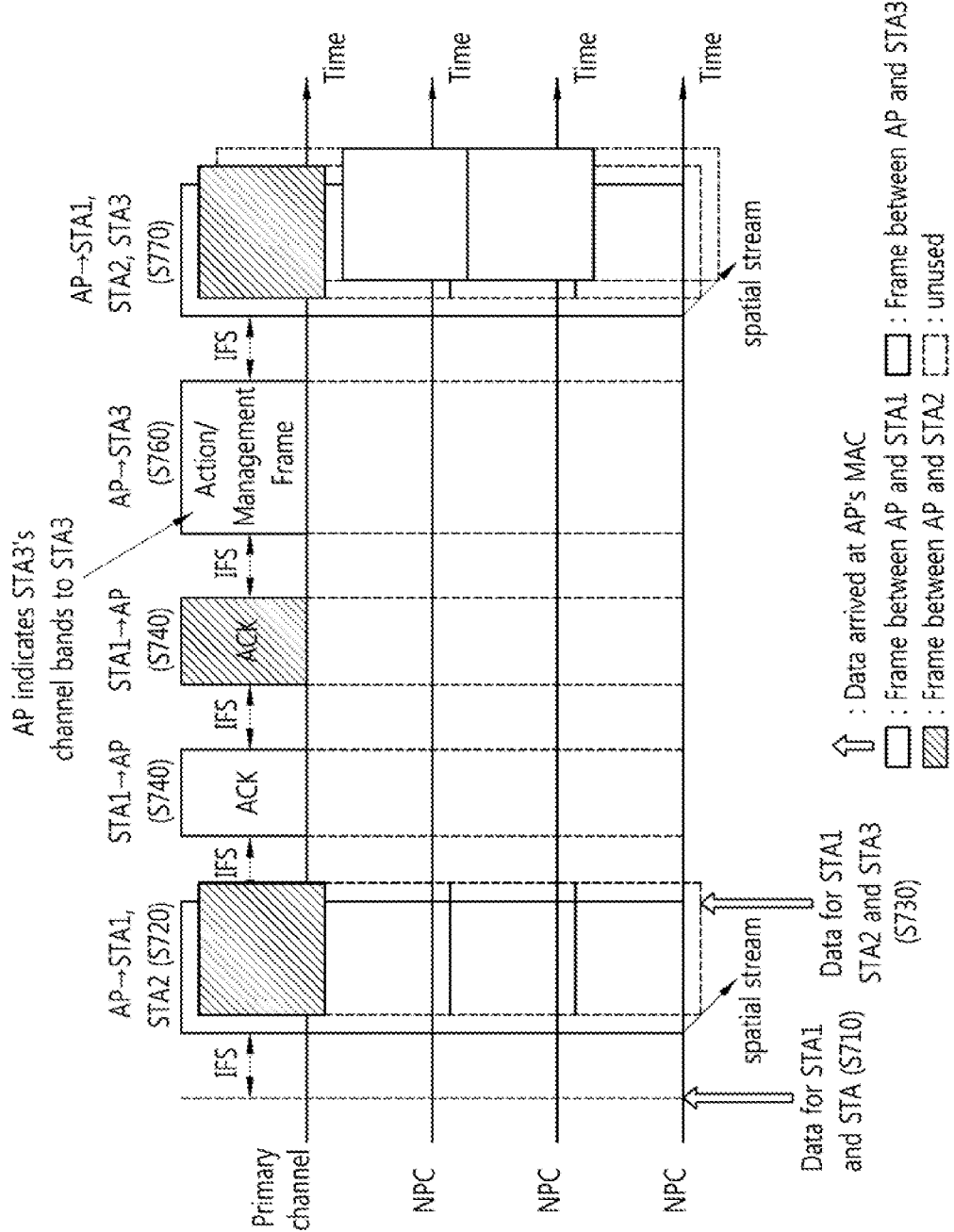
FIG. 7 shows an example of a MU-MIMO transmission method according to an embodiment of the present invention.

FIG. 7 shows an example of a MU-MIMO transmission method according to an embodiment of the present invention.

Referring to FIG. 7, if data to be transmitted to an STA1 and an STA2 is prepared in an MAC entity of an AP (step S710), clear channel assessment (CCA) is performed during interframe space (IFS). Thereafter, the AP starts to perform MU-MIMO transmission to the STA1 and the STA2 upon recognizing that a channel is in an idle state (step S720). Upon receiving respective frames, the STA1 and the STA2 transmit an acknowledgment (ACK) frame to the AP (steps S740 and S750). The STA1 can use only a primary channel when transmitting the ACK frame. Likewise, the STA2 can also use only the primary channel when transmitting the ACK frame. In this case, transmission of the ACK frame can be performed at a different time according to a contention-based medium access control scheme as shown in the figure. However, if uplink MU-MIMO transmission is supported and a transmission channel allocated to a specific STA consists of a secondary channel, transmission of the ACK frame can be performed simultaneously.

During frame transmission, data to be transmitted to three STAs including an STA3 which is a new reception STA arrives at the MAC of the AP (step S730).

After the first frame is transmitted, the AP waits for IFS and thereafter transmits an action frame and/or a management frame to the STA3 (step S760). The action frame and/or management frame to be transmitted may include information regarding a transmission channel to be used by the STA3 to transmit and/or receive the frame. Transmission channel information may include indication information, which indicates that a transmission channel of the STA3 does not include a primary channel and includes a set of secondary channels, and frequency band and/or bandwidth information of the transmission channel.

Upon transmitting the action frame and/or the management frame to the STA3, the AP transmits a frame by starting to perform MU-MIMO transmission on the basis of orthogonal frequency division multiple access (OFDMA) to the STA1, the STA2, and the STA3.

Meanwhile, even if a bandwidth of a transmission channel to be used by each of a plurality of MIMO-paired STAs is determined and downlink MU-MIMO transmission is performed, it is required that an AP receives a PPDU simultaneously from the plurality of STAs similarly to OFDMA-based uplink MU-MIMO transmission. In case of downlink MIMO, a beam is formed by the AP and a frame is transmitted simultaneously to paired STAs through spatial stream. On the other hand, if the STAs transmit a frame to the AP, signaling for allowing all STAs to be able to align frame transmission synchronization is necessary. As such, in order to synchronize uplink MU-MIMO transmission, a method of synchronization triggering is proposed.

Figure 8:
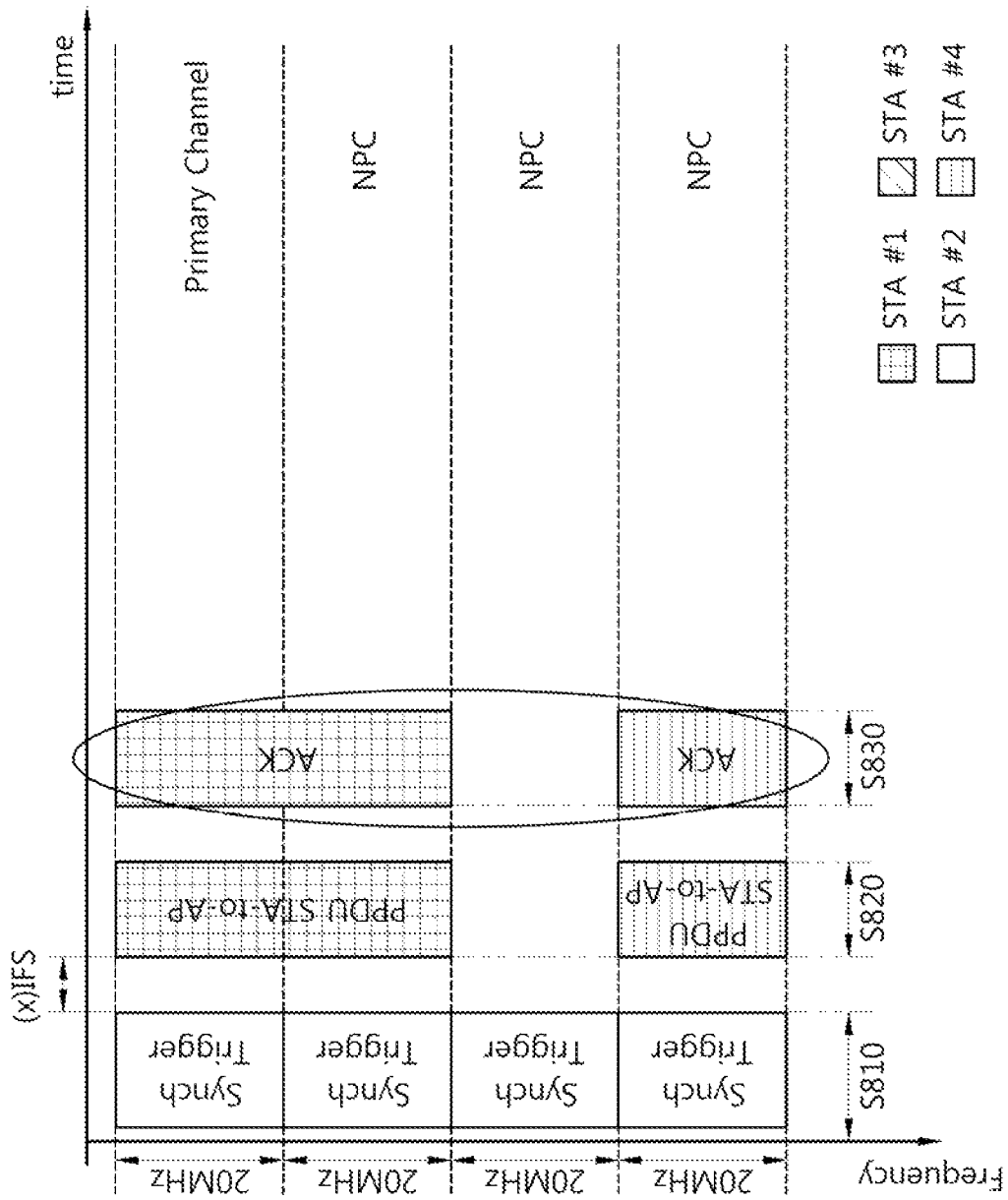
FIG. 8 shows a MIMO-based PPDU reception method according to an embodiment of the present invention.

FIG. 8 shows a MIMO-based PPDU reception method according to an embodiment of the present invention. Although not shown in FIG. 8, it is assumed that an AP has performed in advance an operation of allocating a transmission channel bandwidth to a plurality of MIMO-paired STAs. Accordingly, it is regarded that a transmission channel bandwidth to be used by each of the plurality of MIMO-paired STAs is determined.

Referring to FIG. 8, the AP transmits a sync trigger to the plurality of MIMO-paired STAs (step S810). Upon receiving the sync trigger, the plurality of STAs wait for IFS.

After waiting for the IFS, the plurality of MIMO-paired STAs simultaneously transmit a frame to the AP (step S820). A specific STA to which a transmission channel consisting of only a secondary channel except for a channel bandwidth is allocated among the plurality of MIMO-paired STAs transmits a frame only when the sync trigger is received from the AP.

Upon transmitting the sync trigger for uplink MU-MIMO transmission, in response to frame reception, the AP can transmit an ACK frame by directly using a channel bandwidth at which data is transmitted. Alternatively, by using a primary channel as shown in steps S740 and S750 of FIG. 7, the ACK frame can be transmitted at different times to the MIMO-paired STAs.

Synchronization triggering can be achieved by exchanging a request to send (RTS)/clear to send (CTS) defined in IEEE 802.11, transmitting a CTS-to-self frame, and transmitting an uplink OFDM primitive as a separate frame. Examples thereof will be described below in greater detail with reference to the accompanying drawings.

Figure 9:
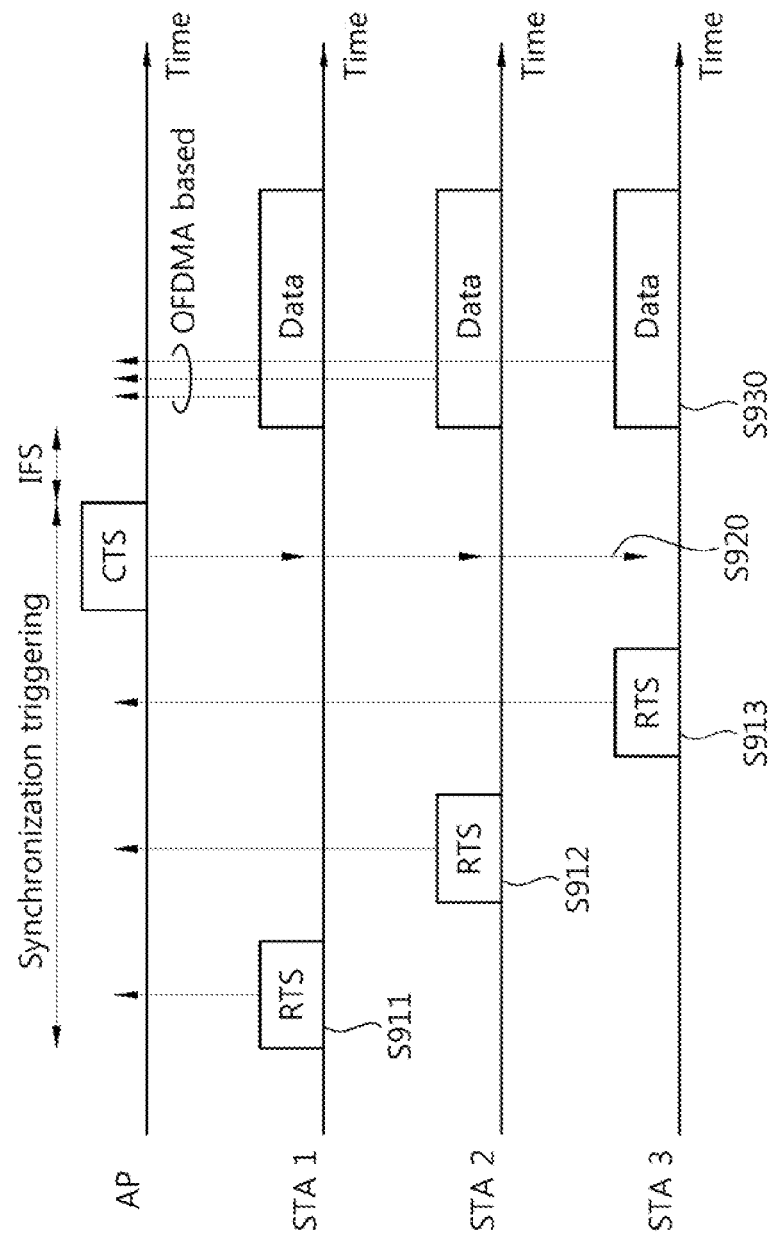
FIG. 9 shows a first example of synchronization triggering for uplink MU-MIMO transmission according to an embodiment of the present invention.

FIG. 9 shows a first example of synchronization triggering for uplink MU-MIMO transmission according to an embodiment of the present invention.

Referring to FIG. 9, an STA1, an STA2, and an STA3 transmit an RTS frame to an AP to transmit a frame to the AP (steps S911, S912, and S913). Upon receiving a plurality of RTS frames, the AP transmits a CTS frame to an STA which transmits the RTS frame (step S920). Upon receiving the CTS frame from the AP, the STA1 and the STA2 can simultaneously transmit data to be transmitted to the AP through OFDMA-based MU-MIMO transmission after waiting for IFS (step S930).

Figure 10:
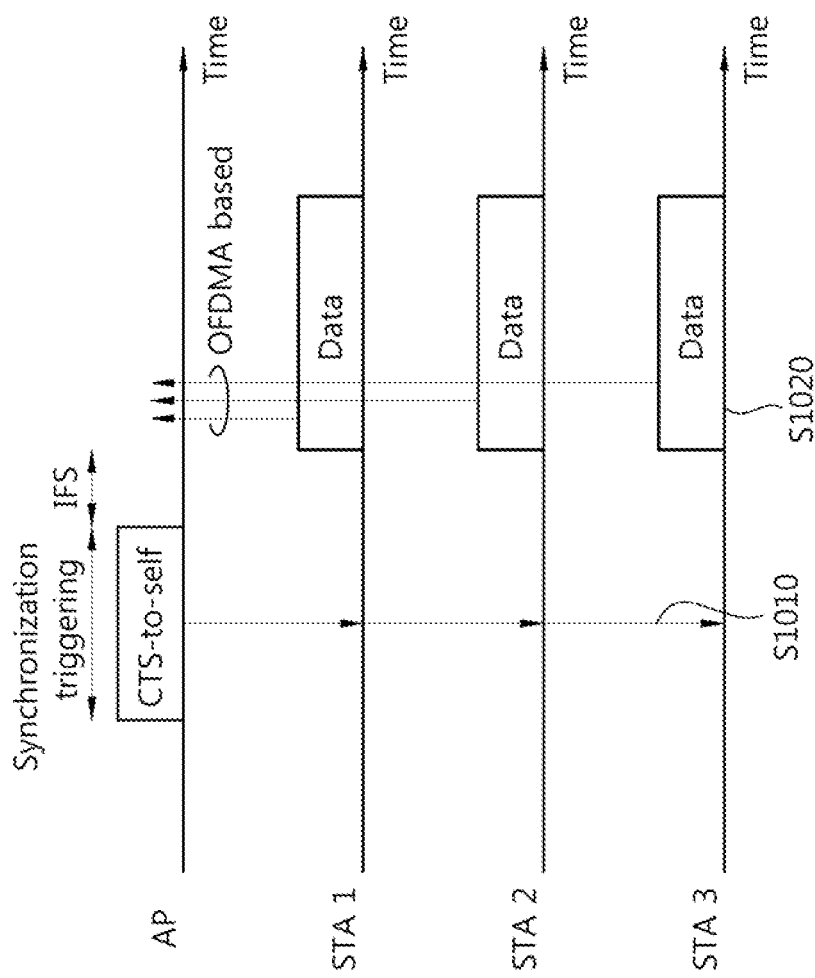
FIG. 10 shows a second example of synchronization triggering for uplink MU-MIMO transmission according to an embodiment of the present invention.

FIG. 10 shows a second example of synchronization triggering for uplink MU-MIMO transmission according to an embodiment of the present invention.

Referring to FIG. 10, an AP transmits a CTS-to-self frame to an STA1, an STA2, and an STA3 which are MIMO-paired (step S1010). The CTS-to-self frame is a CTS frame in which a recipient address field is set to an address for transmitting a CTS frame. That is, if the recipient address field of the CTS frame is set to a value for indicating the AP, this can be referred to as the CTS-to-self frame in this example. Upon receiving the CTS-to-self frame, the STA1, the STA2, and the STA3 can simultaneously transmit data to be transmitted to the AP through OFDMA-based MU-MIMO transmission after waiting for IFS (step S1020).

Figure 11:
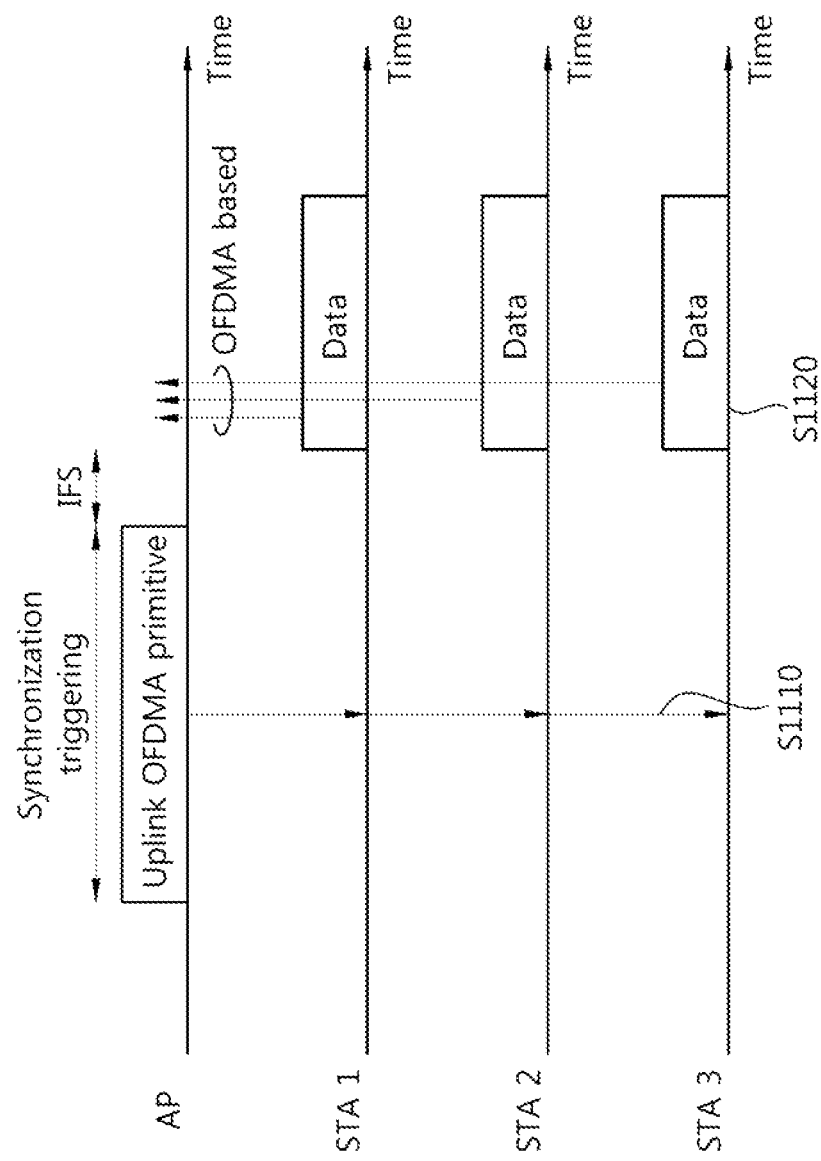
FIG. 11 shows a third example of synchronization triggering for uplink MU-MIMO transmission according to an embodiment of the present invention.

FIG. 11 shows a third example of synchronization triggering for uplink MU-MIMO transmission according to an embodiment of the present invention.

Referring to FIG. 11, an AP transmits an uplink OFDMA primitive to an STA1, an STA2, and an STA3 which are MIMO-paired (step S1110). Upon receiving the OFDMA primitive from the AP, the STA1, the STA2, and the STA3 can simultaneously transmit data to be transmitted to the AP by using OFDMA-based MU-MIMO transmission after waiting for IFS (step S1120).

In addition to the specific examples of the synchronization triggering shown in FIG. 9 to FIG. 11, synchronization triggering can be implemented by using specific frame transmission including sync triggering information. The sync triggering information may include information indicating whether synchronization is achieved. The sync triggering information may include information including a time point at which a PPDU is transmitted by each of a plurality of MU-MIMO paired STAs.

In addition, in the aforementioned uplink and/or downlink MU-MIMO transmission, when different bandwidths are allocated to a plurality of STAs or when the STAs support different bandwidths, it is very important for the AP to transmit transmission channel information to the STA. Hereinafter, an embodiment of delivering bandwidth information of a transmission channel will be described in detail.

Figure 12:
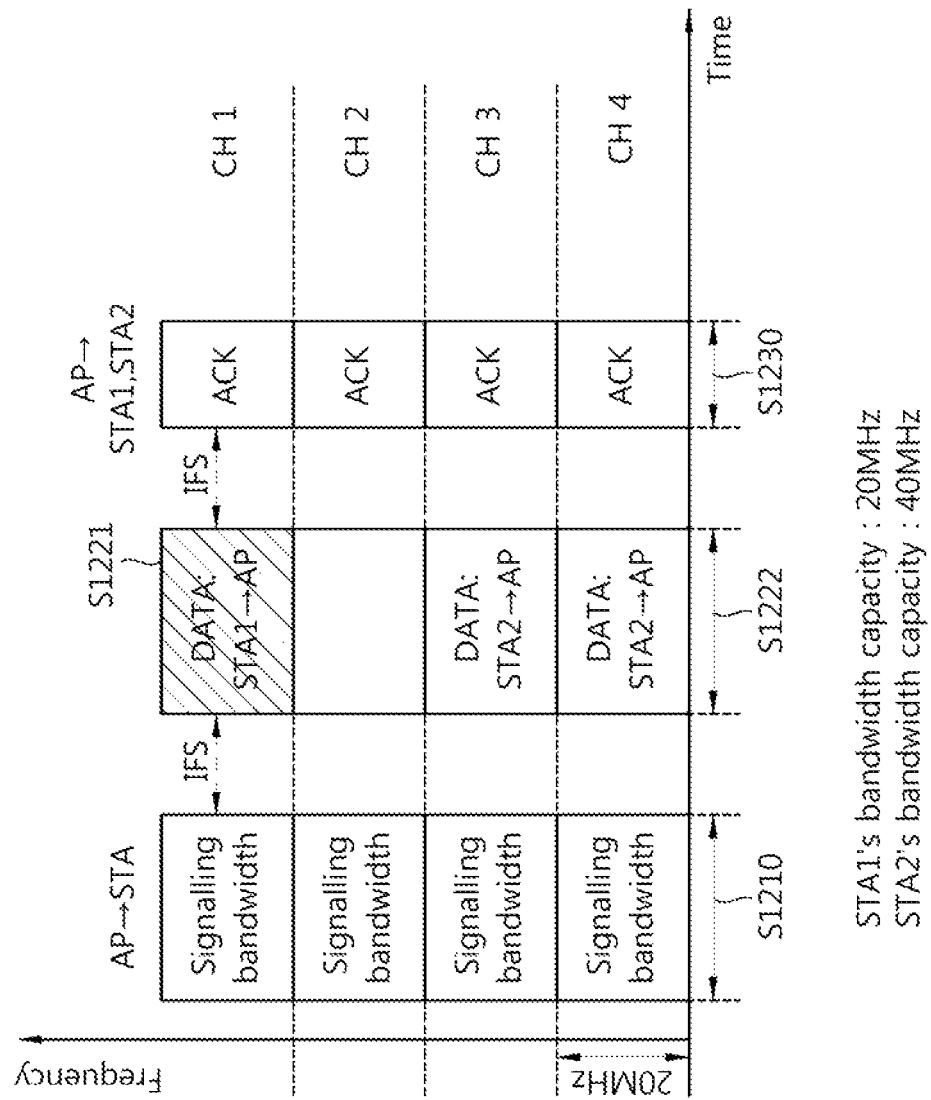
FIG. 12 shows an example of transmitting transmission channel bandwidth information according to an embodiment of the present invention.

FIG. 12 shows an example of transmitting transmission channel bandwidth information according to an embodiment of the present invention. An STA1 supports a 20 MHz bandwidth, and an STA2 supports a 40 MHz bandwidth. A frequency band is 80 MHz in total, and includes four channels (i.e., CH1, CH2, CH3, and CH4) each of which has a 20 MHz bandwidth.

Referring to FIG. 12, the AP performs signaling on a transmission channel bandwidth to be used for each of a plurality of MIMO-paired STAs. The AP performs signaling on each of the STA1 and the STA2 to use a transmission channel of a 40 MHz bandwidth (step S1210). The STA1 and the STA2 determine a transmission channel bandwidth as a bandwidth determined by comparing respective signaled bandwidths with a bandwidth value. The transmission channel bandwidth may be determined to the same value or a smaller value between the signaled bandwidth and a supported bandwidth.

Since the 40 MHz bandwidth is signaled to the STA1, a transmission channel including CH1 and CH2 can be allocated to the STA1. However, since the supported bandwidth is 20 MHz, the STA1 determines the transmission channel bandwidth to 20 MHz, and transmits a frame to the AP by using the CH1 (step S1221).

Since the 40 MHz bandwidth is signaled to the STA2, a transmission channel including CH3 and CH4 can be allocated to the STA2. Since the STA2 can support the 40 MHz bandwidth, the STA2 determines the transmission channel bandwidth to 40 MHz, and transmits a frame to the AP by using the CH3 and the CH4 (step S1222).

Upon receiving a frame through a specific channel from the STA1 and the STA2, the AP transmits an ACK frame to the STA1 and the STA2 in response thereto (step S1230). As illustrated, the AP can transmit the ACK frame to the STA1 and the STA2 by using a full frequency band of the channel as a transmission channel, or can transmit the ACK frame by using a channel in which the frame received from the STA1 and the STA2 is transmitted.

By signaling the transmission channel bandwidth of the STA according to the aforementioned method, a frame can be transmitted by allocating a transmission channel for each of MIMO-paired STAs in a unit of channel band. In addition, when the AP performs signaling on the bandwidth, the STA can be prevented from using a bandwidth more than necessary. An opportunity for accessing the AP can be given to other STAs by preventing one STA from using the bandwidth more than necessary. In addition, when a transmission channel bandwidth is determined to the same value or a smaller value between a signaled bandwidth and a supported bandwidth, even if the AP requests transmission of a bandwidth equal to or greater than a bandwidth supported by the STA, that is, even if the bandwidth equal to or greater than that is signaled, the STA can determine the bandwidth supportable by the STA as the transmission channel bandwidth. Accordingly, there is an advantage in that WLAN capacity can be maximized.

Signaling of the transmission channel bandwidth may be a method of transmitting bandwidth information by inserting the bandwidth information into a PPDU. A VHT-SIGA field and a VHT-SIGB field exist as a field including control information for an STA which receives the PPDU. The VHT-SIGA field is a field including common control information that can be commonly used for a plurality of MIMO-paired STAs. On the other hand, the VHT-SIGB field is a field including dedicated control information used for each of the plurality of MIMO-paired STAs. Therefore, transmission channel bandwidth information to be signaled to each of the plurality of MIMO-paired STAs may be included in the VHT-SIGB field. When the STA receives the PPDU, the STA can acquire the transmission channel bandwidth information by decoding the VHT-SIGB field. An embodiment of signaling the transmission channel bandwidth information through the VHT-SIGB field will be described below in detail with reference to the accompanying drawings.

Figure 13:
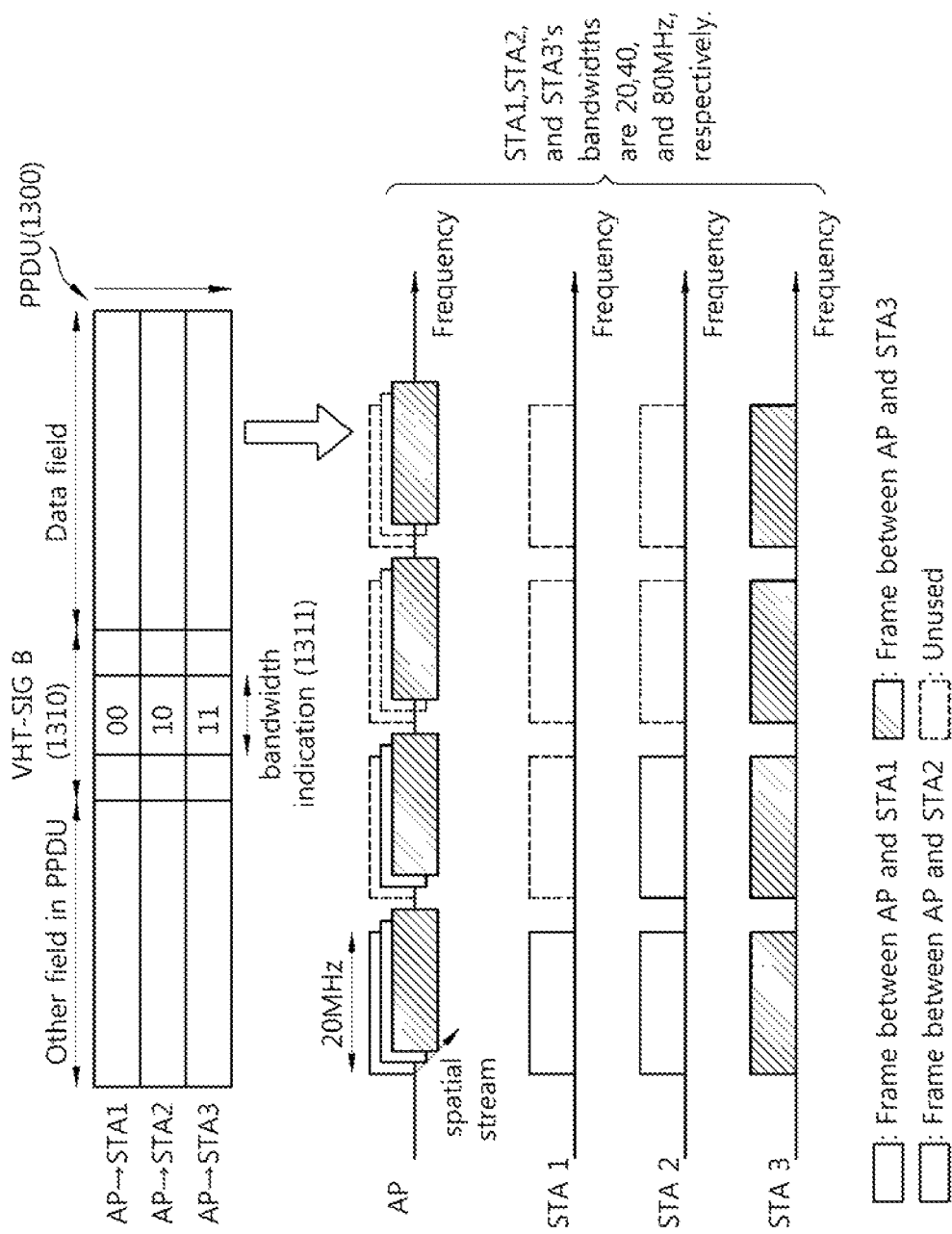
FIG. 13 shows an example of a method of indicating a transmission channel bandwidth according to an embodiment of the present invention.

FIG. 13 shows an example of a method of indicating a transmission channel bandwidth according to an embodiment of the present invention.

Referring to FIG. 13, a bandwidth indication sub-field 1311 is included in a VHT-SIGB field 1310 of a PPDU 1300 to be transmitted to STAs (i.e., STA1, STA2, and STA3) which are MIMO-paired with an AP. The bandwidth indication sub-field 1311 includes transmission channel bandwidth information of a bitmap format. Therefore, the bandwidth indication sub-field 1311 may have a specific bit size and may indicate a different bandwidth value depending on a bit-stream. Since there are four types of value in the bandwidth in FIG. 9, the bandwidth indication sub-field 1311 may have a 2-bit size and may include a bit-stream having a 2-bit size as a value thereof. Table 1 below shows the bandwidth value depending on the bit-stream included in the bandwidth indication sub-field 1311.

TABLE 1

| Bandwidth indication sub-field | bandwidth |
| --- | --- |
| 00 | 20 MHz |
| 01 | 40 MHz |
| 10 | 60 MHz |
| 11 | 80 MHz |

Therefore, different transmission channel bandwidths can be signaled and used for each STA in such a manner that the STA1 uses 20 MHz, the STA2 uses 40 MHz, and the STA3 uses 80 MHz.

Figure 14:
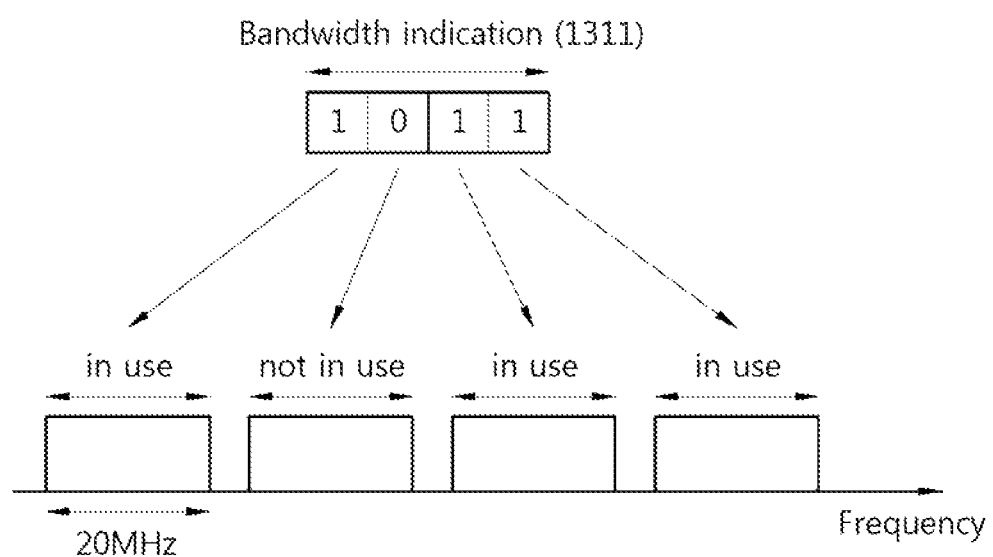
FIG. 14 shows another example of a method of indicating a transmission channel bandwidth according to an embodiment of the present invention.

FIG. 14 shows another example of a method of indicating a transmission channel bandwidth according to an embodiment of the present invention. Although a bandwidth is indicated when there are four channels each having a 20 MHz bandwidth in this method for example, the present invention can be adaptively applied in practice according to a given channel environment.

In FIG. 14, similarly to FIG. 13, a bandwidth indication sub-field 1311 is included in a VHT-SIGB field, and transmission channel bandwidth information is signaled by using the sub-field. Herein, a size of the bandwidth indication sub-field 1311 is configured to have a 4-bit value which is equal to the number of channels. Each bit corresponds to one channel. If a bit value is '1', it indicates that the channel is allocated to a transmission channel, and if the bit value is '0', it indicates that the channel is not allocated. For example, since a bit-stream included in the bandwidth indication sub-field 1311 is '1011' in the figure, CH1, CH3, and CH4 are allocated as a transmission channel to be used by the STA, but CH2 is not allocated.

In addition, information for indicating whether smoothing is performed can be signaled for a plurality of MIMO-paired STAs in the embodiment of the present invention supporting MU-MIMO transmission. In a channel environment having a low delay spread, that is, in a flat fading channel, correlation is high between adjacent subcarriers, and thus there is an advantage of noise suppression when performing channel smoothing. On the other hand, in an environment having a great delay spread, that is, in a frequency selective channel, correlation is low between adjacent subcarriers, and thus there may be an adverse effect when performing channel smoothing. Therefore, it may be necessary to perform signaling to indicate whether to perform channel smoothing according to a channel environment to be used by the STA.

Since the IEEE 802.11n standard supports single user (SU)-MIMO, a 1-bit size is enough for a smoothing indication bit to indicate whether to perform channel smoothing of one MIMO-paired STA. On the other hand, the VHT WLAN system supports MU-MIMO, and thus the 1-bit size is not enough for the smoothing indication bit because whether to perform channel smoothing of a plurality of MIMO-paired STAs must be signaled. Therefore, the present invention proposes a method of inserting the smoothing indication field into the VHT-SIGA field or the VHT-SIGB field of the PPDU.

The VHT-SIGA field indicates common control information of a plurality of MIMO-paired STAs when transmitting the PPDU. Therefore, when the VHT-SIGA field includes information regarding whether to perform channel smoothing on each of the plurality of STAs, the STA can determine whether to perform smoothing by receiving the VHT-SIGA.

The VHT-SIGB field indicates dedicated control information for each of the plurality of MIMO-paired STAs. Therefore, when the VHT-SIGB field includes a smoothing indication field of a bit field format, each STA can know whether to perform channel smoothing by interpreting the VHT-SIGB field. This will be described in greater detail with reference to the accompanying drawings.

Figure 15:
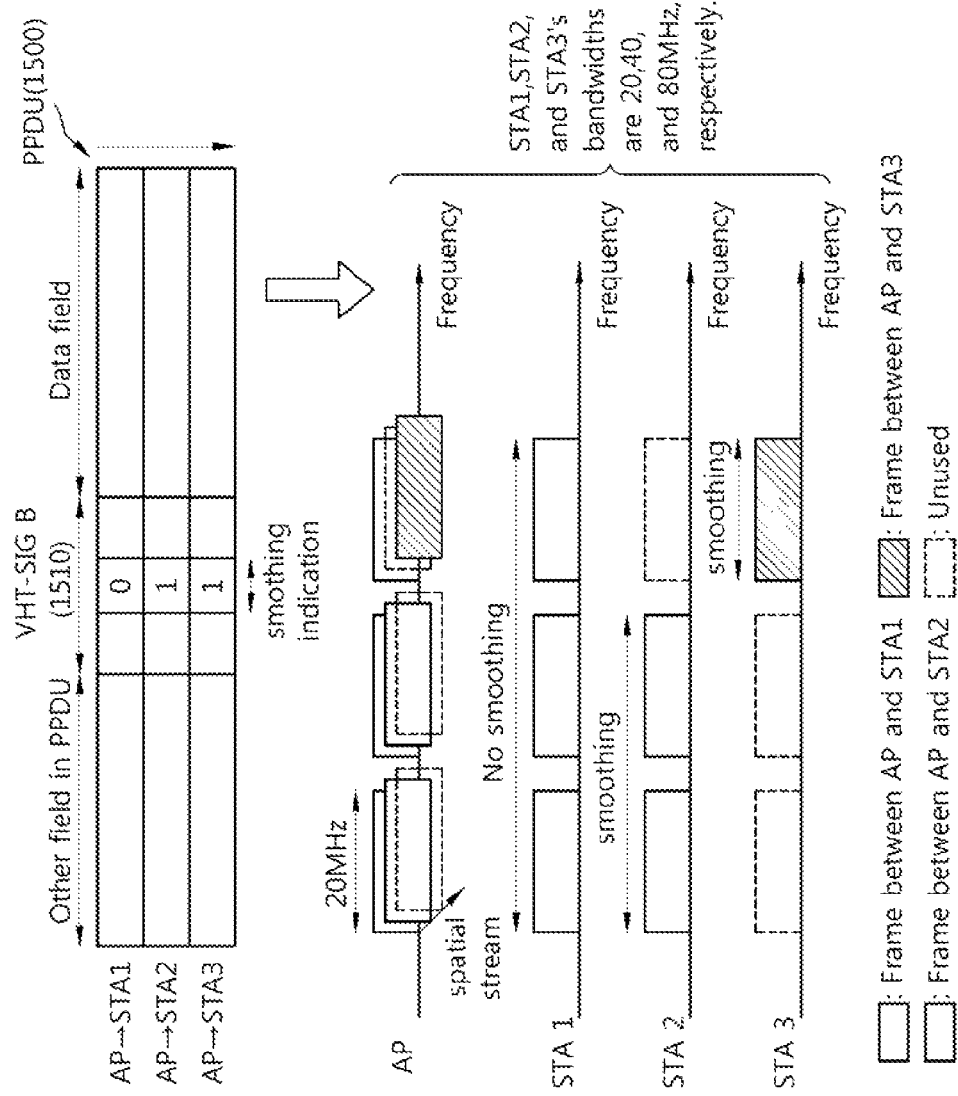
FIG. 15 shows an example of signaling channel smoothing according to an embodiment of the present invention.

FIG. 15 shows an example of signaling channel smoothing according to an embodiment of the present invention.

Referring to FIG. 15, a smoothing indication sub-field 1511 is included in a VHT-SIGB field 1510 of a PPDU 1500 to be transmitted to STAs (i.e., STA1, STA2, and STA3)

which are MIMO-paired with an AP. The smoothing indication sub-field 1511 may include a value 0 or a value 1 as a bit field. It can be configured such that channel smoothing is not performed when the bit value is '0', and channel smoothing is performed when the bit value is '1'.

Since a value of the smoothing indication sub-field 1511 included in the VHT-SIGB field 1510 is 0, the STA1 does not perform channel smoothing. The STA2 and the STA3 perform channel smoothing since a value of the smoothing indication sub-field 1511 is 1. As such, by using that the VHT-SIGB field 1510 is dedicated control information for a specific STA, whether to perform channel smoothing for each of the plurality of MIMO-paired STAs can be properly indicated.

Figure 16:
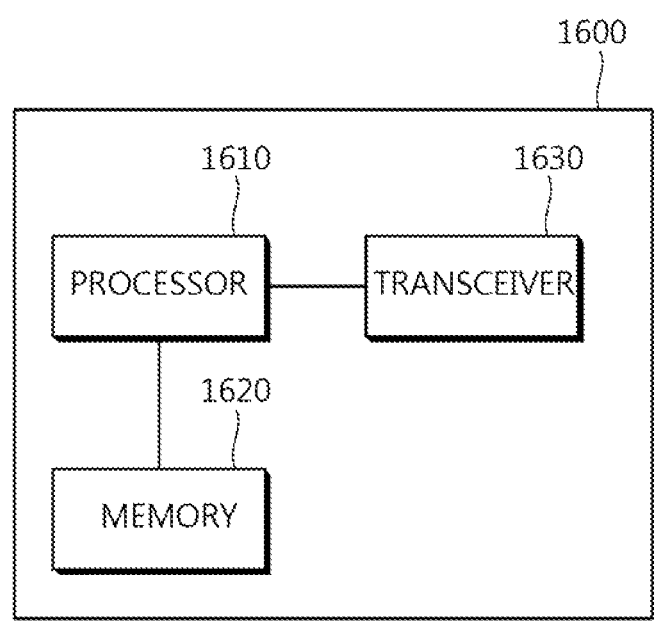
FIG. 16 is a block diagram showing a wireless apparatus for implementing an embodiment of the present invention.

FIG. 16 is a block diagram showing a wireless apparatus for implementing an embodiment of the present invention. A wireless apparatus 1600 may be an AP or an STA.

Referring to FIG. 16, a wireless apparatus 1600 includes a processor 1610, a memory 1620, and a transceiver 1630. The transceiver 1630 transmits and/or receives a radio signal, and implements an IEEE 802.11 physical layer. The processor 1610 is operationally coupled to the transceiver 1630, and is configured to implement a MAC layer and/or PHY layer for implementing the embodiment of the present invention shown in FIG. 6 to FIG. 15 to transmit a PPDU according to the MU-MIMO transmission method.

The processor 1610 and/or the transceiver 1630 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1620 and may be performed by the processor 1610. The memory 1620 may be located inside or outside the processor 1610, and may be coupled to the processor 1610 by using various well-known means.

The invention claimed is:

1. A method for transmitting data in a wireless local area network, the method comprising:
  transmitting, by the transmitting station, a trigger frame to a plurality of receiving stations, wherein the trigger frame comprises:
    a bandwidth field indicating an operating bandwidth which is divided into a plurality of transmission channels;
    a plurality of identifiers, each of the plurality of identifiers identifying a respective one of the plurality of receiving stations that is requested to perform an uplink multi-user multiple input multiple output (MU-MIMO) transmission; and
    a plurality of channel fields, each of the plurality of channel fields indicating a transmission channel of the plurality of transmission channels that is assigned to a corresponding one of the plurality of receiving stations;
  receiving, by the transmitting station, a plurality of data frames from the plurality of receiving stations, each of the plurality of data frames being received through a transmission channel assigned to a corresponding one of the plurality of receiving stations; and
  transmitting, by the transmitting station to the plurality of receiving stations, a plurality of acknowledgment frames acknowledging a corresponding one of the plurality of data frames, each of the plurality of acknowledgement frames being transmitted through the transmission channel assigned to the corresponding one of the plurality of receiving stations,
  wherein a first time interval between the trigger frame and the plurality of data frames is equal to a second time interval between the plurality of data frames and the plurality of acknowledgment frames.

2. A device for transmitting data in a wireless local area network comprising:
  a transceiver configured to transmit and receive radio signal; and
  a processor operatively coupled to the transceiver and configured to:
  instruct the transceiver to transmit a trigger frame to a plurality of receiving stations, wherein the trigger frame comprises:
    a bandwidth field indicating an operating bandwidth which is divided into a plurality of transmission channels;
    a plurality of identifiers, each of the plurality of identifiers identifying a respective one of the plurality of receiving stations that is requested to perform an uplink multi-user multiple input multiple output (MU-MIMO) transmission; and
    a plurality of channel fields, each of the plurality of channel fields indicating a transmission channel of the plurality of transmission channels that is assigned to a corresponding one of the plurality of receiving stations;
  instruct the transceiver to receive a plurality of data frames from the plurality of receiving stations, each of the plurality of data frames being received through a transmission channel assigned to a corresponding one of the plurality of receiving stations; and
  instruct the transceiver to transmit, to the plurality of receiving stations, a plurality of acknowledgement frames acknowledging a corresponding one of the plurality of data frames, each of the plurality of acknowledgment frames being transmitted through the transmission channel assigned to the corresponding one of the plurality of receiving stations,
  wherein a first time interval between the trigger frame and the plurality of data frames is equal to a second time interval between the plurality of data frames and the plurality of acknowledgment frames.

3. The method of claim 1, wherein the transmitting station is an access point.

4. The method of claim 1, wherein the plurality of acknowledgement frames are simultaneously transmitted.

5. The method of claim 1, wherein the operating bandwidth is 20 MHz, 40 MHz, 80 MHz or 160 MHz.

6. The method of claim 1, wherein the trigger frame is transmitted as a physical layer protocol data unit (PPDU).

7. The method of claim 1, wherein the trigger frame further includes a plurality of stream allocation identifiers, each of the plurality of stream allocation identifiers indicating a spatial stream that is assigned to a corresponding one of the plurality of receiving stations.

8. The device of claim 2, wherein the plurality of acknowledgement frames are simultaneously transmitted.

9. The device of claim 2, wherein the operating bandwidth is 20 MHz, 40 MHz, 80 MHz or 160 MHz.

10. The device of claim 2, wherein the trigger frame is transmitted as a physical layer protocol data unit (PPDU).

11. The device of claim 2, wherein the trigger frame further includes a plurality of stream allocation identifiers, each of the plurality of stream allocation identifiers indicating a spatial stream that is assigned to a corresponding one of the plurality of receiving stations.

12. The method of claim 1, wherein at least one of the first time interval or the second time interval is an interframe space (IFS).

13. The device of claim 2, wherein at least one of the first time interval or the second time interval is an interframe space (IFS).

* * * * *